US007502477B1

(12) United States Patent
Inanaga et al.

(10) Patent No.: US 7,502,477 B1
(45) Date of Patent: Mar. 10, 2009

(54) AUDIO REPRODUCING APPARATUS

(75) Inventors: Kiyofumi Inanaga, Kanagawa (JP); Yuji Yamada, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/424,684

(22) PCT Filed: Mar. 29, 1999

(86) PCT No.: PCT/JP99/01599

§ 371 (c)(1), (2), (4) Date: Nov. 29, 1999

(87) PCT Pub. No.: WO99/51061

PCT Pub. Date: Oct. 7, 1999

(30) Foreign Application Priority Data

Mar. 30, 1998 (JP) ................................ 10-083810

(51) Int. Cl.
*H04R 5/00* (2006.01)
*H04R 5/02* (2006.01)
*G06F 17/00* (2006.01)

(52) U.S. Cl. ............................ 381/17; 381/18; 381/19; 381/20; 381/21; 381/22; 381/23; 381/307; 381/309; 381/310; 381/1; 700/94

(58) Field of Classification Search ................ 381/307, 381/309, 310, 17–23, 12, 74, 22, 102–109, 381/1, 31; 700/94
See application file for complete search history.

(56) References Cited

U.S. PATENT DOCUMENTS 5,590,204 A * 12/1996 Lee ............................ 381/309
5,799,094 A * 8/1998 Mouri ......................... 381/18
5,870,480 A * 2/1999 Griesinger ................... 381/18
6,259,795 B1 * 7/2001 McGrath .................... 381/310
6,553,121 B1 * 4/2003 Matsuo et al. ................ 381/17
6,850,621 B2 * 2/2005 Sotome et al. ................ 381/17

FOREIGN PATENT DOCUMENTS

EP 0917400 11/1998
EP 1054574 12/1998
GB 2339127 2/1999
JP 51-148903 A 11/1976

* cited by examiner

*Primary Examiner*—Vivian Chin
*Assistant Examiner*—Devona E Faulk
(74) *Attorney, Agent, or Firm*—Lerner, David, Littenberg, Krumholz & Mentlik, LLP

(57) ABSTRACT

A distributing circuit distributes audio signals of a predetermined number of channels to audio signals of a predetermined number of channels. A first signal processing circuit processes audio signals that are output from the distributing circuit in parallel, reproduces the resultant signals with a plurality of speakers, and localizes sound images of the individual audio signals at predetermined positions. A second signal processing circuit inputs audio signals that are output to the plurality of speakers and performs signal processes equivalent to the transfer functions from the individual speakers to both the ears of the listener. The output signals of the second signal processing circuit are reproduced with the headsets.

3 Claims, 14 Drawing Sheets

AUDIO REPRODUCING APPARATUS

TECHNICAL FIELD

The present invention relates to an audio reproducing apparatus having a reproducing function for audio signals of multiple channels.

BACKGROUND ART

Audio signals corresponding to a picture such as a movie are recorded on multiple channels so that the recorded audio signals are reproduced from speakers disposed at a left front position, a right front position, a center front position, a left back position, and a right back position of the listener or from speakers disposed at a left position and a right position of the listener. With these speakers, the position of a sound source in a picture matches the position of a real sound image. Thus, a sound field with a naturally spacial impression is accomplished.

However, when the listener listens to such sound with headsets, the sound image is localized in his or her head. Thus, the direction of the picture does not match the localized position of the sound image. Consequently, an unnatural sound image is localized. In addition, the audio signals of individual channels cannot be reproduced in such a manner that the localized positions thereof are separated. This problem also takes place when the listener listens to only sounds of multiple channels such as musical sounds. In this case, unlike with sounds reproduced with speakers, the listener hears sounds from his or her head. Thus, since the localized positions of sound images are not separated, a sound field is very unnaturally reproduced.

An object of the present invention is to solve unnaturalness in sounds reproduced with headsets, in particularly, to localize a sound image at a predetermined position.

DISCLOSURE OF THE INVENTION

The present invention is an audio reproducing apparatus for controlling transfer functions of audio signals of a predetermined number of channels supplied to speakers or headsets and reproducing the audio signals of the predetermined number of channels in stereo with the speakers or headsets, the apparatus comprising:

a distributing circuit for distributing audio signals of a predetermined number of channels to audio signals of a predetermined number of channels;

a first signal processing circuit for processing audio signals that are output from said distributing circuit in parallel, reproducing the resultant signals with a plurality of speakers, and localizing sound images of the individual audio signals at predetermined positions; and a second signal processing circuit for inputting audio signals that are output to the plurality of speakers and performing signal processes equivalent to the transfer functions from the individual speakers to both the ears of the listener, wherein output signals of said second signal processing circuit are reproduced with the headsets.

Thus, a stereo sound field of speakers is reproduced with headsets. The sound images of the signals distributed to the stereo sound field are localized.

BEST MODES FOR CARRYING OUT THE INVENTION

Figure 1:
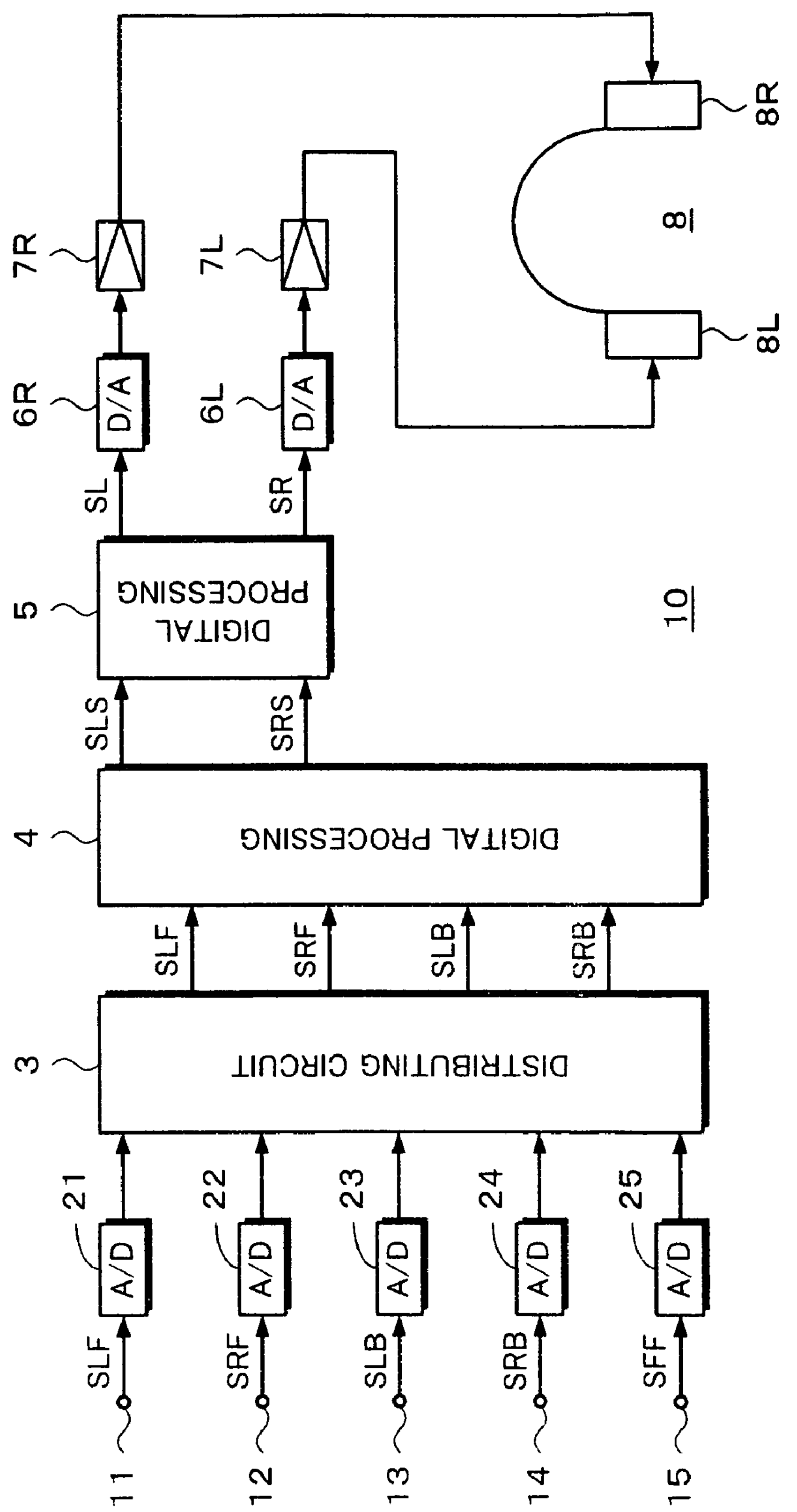
FIG. 1 is a block diagram showing the structure of a first embodiment of the present invention.

In FIG. 1, reference numeral 10 is an audio reproducing apparatus according to a first embodiment of the present invention. In FIG. 1, letters SLF, SRF, SLB, and SRB are audio signals of four channels. When the signals SLF, SRF, SLB, and SRB are supplied to speakers disposed at a left front position, a right front position, a left back position, and a right back position of the listener, a sound field of the audio signals of four channels is accomplished. In FIG. 1, letter SFF is an audio signal as the fifth channel. The signal SFF adds a new sound image to the sound field generated by the signals SLF to SRB.

The audio signals SLF to SFF are supplied to A/D converter circuits 21 to 25 through input terminals 11 to 15, respectively. The A/D converter circuits 21 to 25 convert the audio signals SLF to SFF into respective digital audio signals. The digital audio signals SLF to SFF are supplied to a distributing circuit 3.

Figure 2:
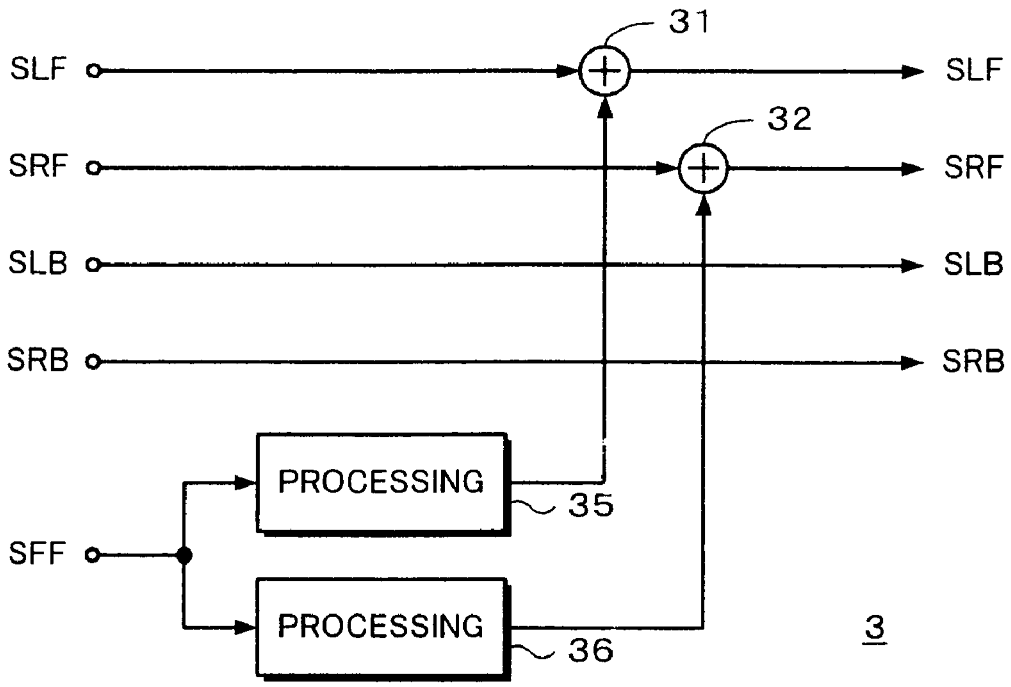
FIG. 2 is a schematic diagram showing the structure of a circuit according to the first embodiment of the present invention.

The distributing circuit 3 is structured as shown in FIG. 2. In other words, the distributing circuit 3 shown in FIG. 2 outputs the signals SLF and SRF to the next staged circuit through adding circuits 31 and 32, respectively. In contrast, the distributing circuit 3 directly outputs the signals SLB and SRB to the next staged circuit. The signal SFF is supplied to the adding circuits 31 and 32 through signal processing circuits 35 and 36, respectively. In this example, the signal processing circuits 35 and 36 are for example variable attenuator circuits. Thus, the signal SFF is distributed with a ratio determined by the variable attenuator circuits 35 and 36 and mixed with the signals SLF and SRF, respectively.

The signals SLF and SRF to which the signal SFF has been distributed and the signals SLB and SRB are supplied to a first digital processing circuit 4. The first digital processing circuit 4 is composed of for example a DSP. The detail of the digital processing circuit 4 will be described later. In brief, the digital processing circuit 4 converts the audio signals SLF to SRB into audio signals SLS and SRS of which sound images of audio signals of four channels are localized with two speakers.

In other words, the digital processing circuit 4 converts the signals SLF to SRB into the signal SLS and SRS in such a manner that when the signals SLS and SRS are supplied to speakers disposed at a left front position and a right front position of the listener, a sound field of which the signals SLF, SRF, SLB, and SRB are supplied to speakers disposed at a left front position, a right front position, a left back position, and a right back position of the listener is accomplished (at this point, although the audio signals SLF to SRB are digital signals, they are treated as analog signals for easy understanding).

The signals SLS and SRS that are output from the digital processing circuit 4 are supplied to a second digital processing circuit 5. The digital processing circuit 5 is composed of for example a DSP. The digital processing circuit 5 converts the audio signals SLS and SRS into audio signals SL and SR of which sound images are localized outside the head of the listener with headsets. In other words, the digital processing circuit 5 converts the signals SLS and SRS into the signals SL and SR in such a manner that when the signals SL and SR are supplied to the headsets, a sound field of which the signals SLS and SRS are supplied to speakers disposed at a left front position and a right front position of the listener is accomplished.

The audio signals SL and SR are supplied to D/A converter circuits 6L and 6R, respectively. The D/A converter circuits 6L and 6R convert the digital audio signals SL and SR into analog audio signals SL and SR, respectively. The resultant audio signals SL and SR are supplied to left and right acoustic units (signal-acoustic converting devices) 8L and 8R on the left and right of the headsets 8 through headset amplifiers 7L and 7R, respectively.

In such a structure, the audio signals SL and SR supplied to the headsets 8 are signals of which sound images of the audio signals SLS and SRS reproduced with speakers are localized with the headsets 8. The audio signals SLS and SRS are signals of which the audio signals SLF to SRB of fourth channels are converted so that sound images of four channels are localized with two speakers.

Thus, with the headsets 8, a sound field of which the audio signals SLF to SRB of four channels are supplied to four speakers can be accomplished.

Figure 3:
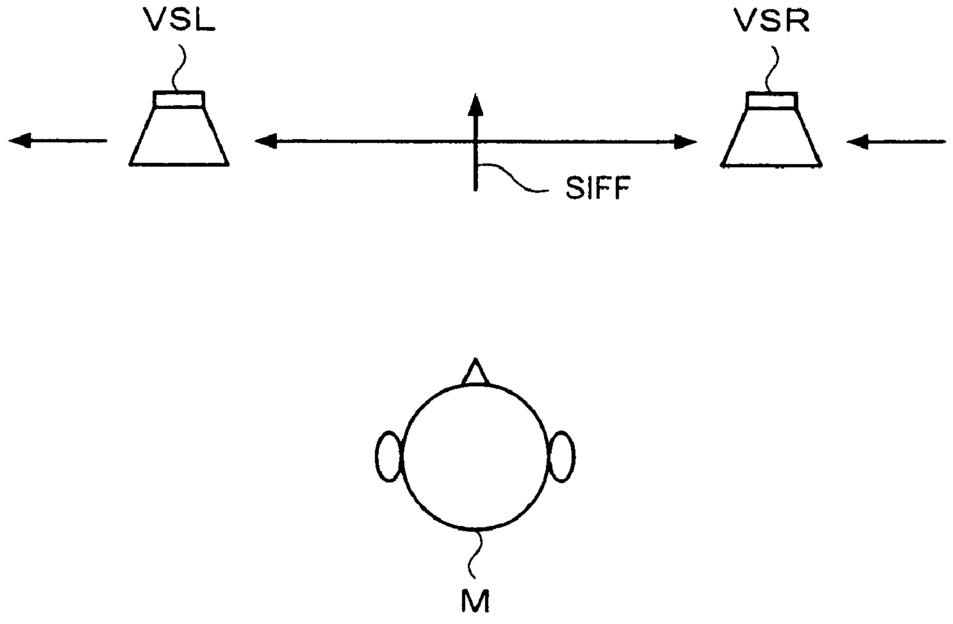
FIG. 3 is a schematic diagram showing characteristics for explaining the present invention.

At this point, since the distributing circuit 3 distributes the signal SFF to the signals SLF and SRF, as shown in FIG. 3, a sound image SIFF of the signal SFF is localized in front of a listener M. When the ratio of the signal SFF distributed to the signal SLF and the ratio of the signal SFF distributed to the signal SRF are complementarily varied, the sound image SIFF of the signal SFF moves to the left and to the right between speakers VSL and VSR virtually disposed at a left front position and a right front position of the listener M corresponding to the distributed ratios. In other words, the sound image SIFF of the signal SFF can be localized at a left front position and a right front position as well as at a center front position of the listener M.

Alternatively, when the ratio of the signal SFF distributed to the signal SLF and the ratio of the signal SFF distributed to the signal SRF are varied in the same direction, the level of the sound image SIFF of the signal SFF can be varied without need to vary the localized position.

When the signal processing circuits 31 and 32 are phase shifter circuits that cause the phases of the signals SFF and SFF distributed to the signals SLF and SRF to differ from each other, the sound image SIFF of the signal SFF can be moved and localized outside the virtual speakers VSL and VSR corresponding to the phase difference of the signals SFF and SFF.

Next, a process for converting the number of channels of a sound field of speakers will be described. The process is performed by the digital processing circuit 4. In this example, the digital processing circuit 4 is composed of a discrete circuit.

Figure 4:
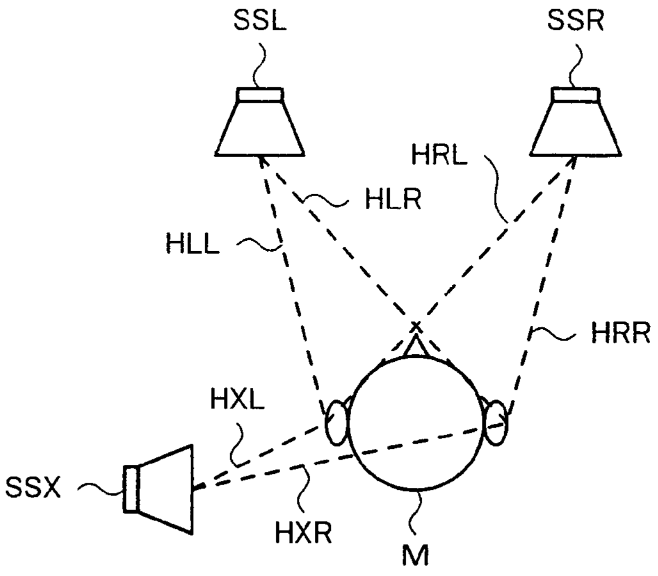
FIG. 4 is a plan view for explaining the present invention.

Now, as shown in FIG. 4, sound sources SSL and SSR are disposed at a left front position and a right front position of a listener M. A sound source SSX is equivalently reproduced at any position outside the head of the listener M with the source sources SSL and SSR. In this example, the sources SSL and SSR are expressed by the following formulas (1) and (2).

$$SSL=(HXL\times HRR-HXR\times HRL)/(HLL\times HRR-HLR\times HRL)\times SSX \quad (1)$$

$$SSR=(HXR\times HLL-HXL\times HLR)/(HLL\times HRR-HLR\times HRL)\times SSX \quad (2)$$

where HLL is the transfer function from the sound source SSL to the left ear of the listener M; HLR is the transfer function from the sound source SSR to the right ear of the listener M; HRL is the transfer function from the sound source SSR to the left ear of the listener M; HRR is the transfer function from the sound source SSR to the right ear of the listener M; HXL is the transfer function from the sound source SSX to the left ear of the listener M; and HXR is the transfer function from the sound source SSX to the left ear of the listener M.

Thus, when an input audio signal SX corresponding to the sound source SSX is supplied to a speaker disposed at the position of the sound source SSL through a filter that accomplishes the transfer function portion of formula (1) and the signal SX is supplied to a speaker disposed at the position of the sound source SSR through a filter that accomplishes the transfer function portion of formula (2), the sound source of the audio signal SX can be localized at the position of the sound source SSX.

Figure 5:
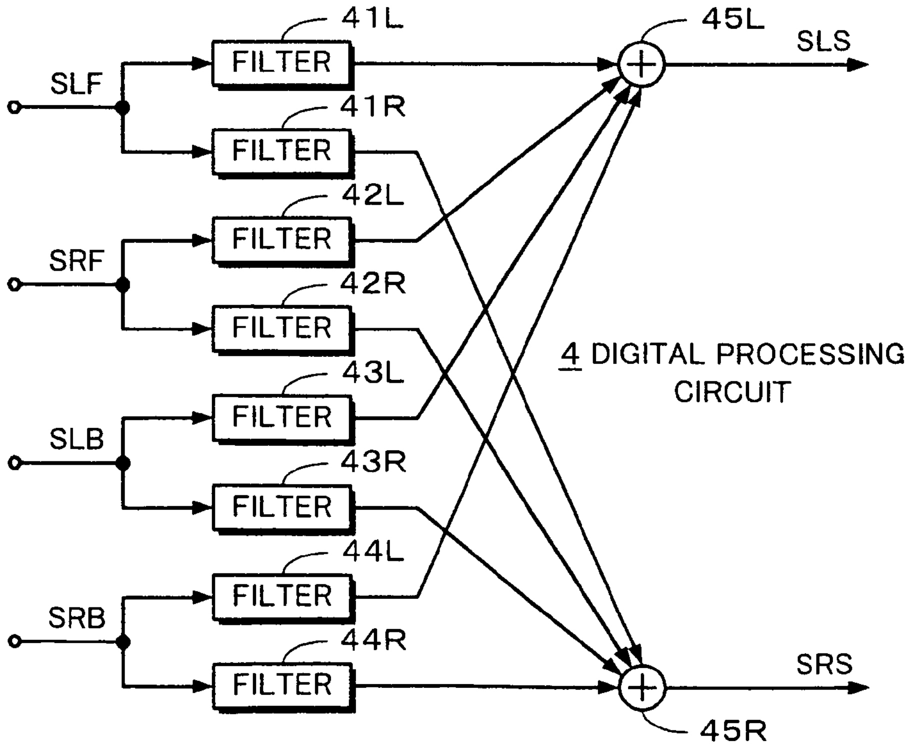
FIG. 5 is a schematic diagram showing the structure of a circuit according to the first embodiment of the present invention.
Figure 6A:
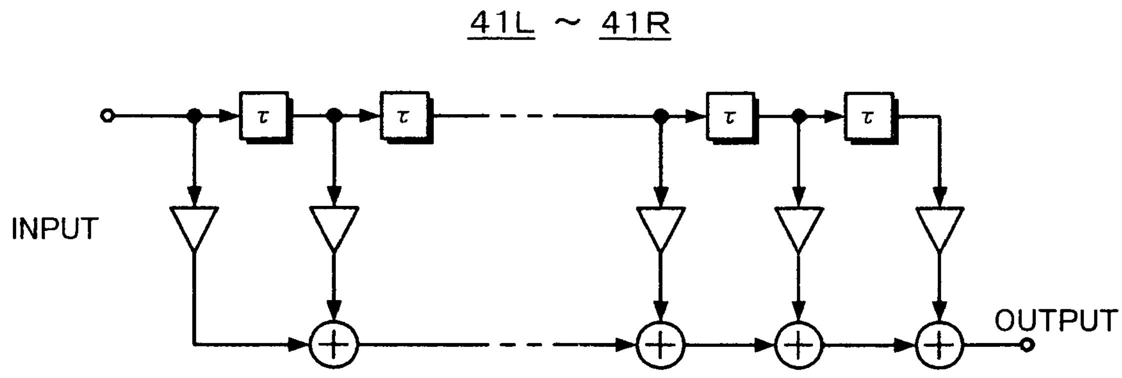
FIGS. 6A and 6B are schematic diagrams showing the structures of circuits according to the first embodiment of the present invention.
Figure 6B:
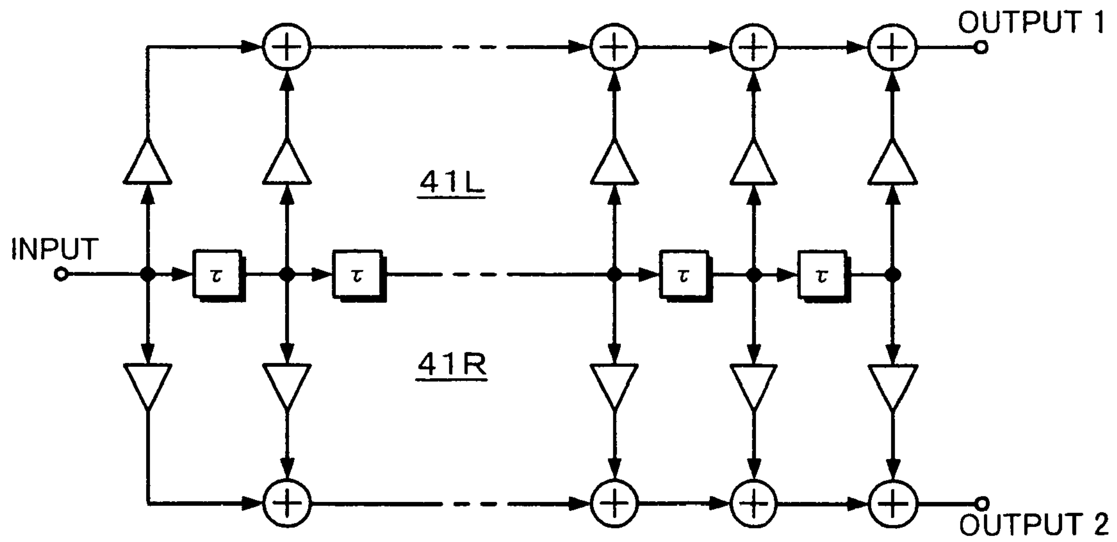

As shown in FIG. 5, the digital processing circuit 4 is composed of digital filters 41L to 44L and 41R to 44R and adding circuits 45L and 45R. In this example, as shown in FIG. 6A, each of the digital filters is of FIR type composed of delaying circuits, coefficient circuits, and adding circuits. Alternatively, as shown in FIG. 6B, the filters 51L and 41R may share delaying circuits.

The audio signals SLF to SRB that are output from the distributing circuit 3 are supplied to the adding circuit 45L through the filters 41L to 44L. In addition, the audio signals SLF to SRB are supplied to the adding circuit 45R through the digital filters 41L to 44R.

At this point, the transfer functions of the digital filters 41L to 44L and 41R to 44R are set to predetermined values as described above. Impulse responses of which the transfer function portions of formulas (1) and (2) are converted on the time axis are superimposed to the audio signals SLF to SRB.

Thus, the adding circuit 45L outputs the audio signal SLS. The adding circuit 45R outputs the audio signal SRS. In other words, the adding circuits 45L and 45R output the audio signals SLS and SRS that allow a sound field of which the audio signals SLF to SRB of four channels are reproduced with four speakers to be accomplished with two speakers.

Next, a process for converting audio signals reproduced with speakers into signals SL and SR reproduced with the headsets 8 will be described. This process is performed by the digital processing circuit 5. In this example, the digital processing circuit 5 is composed of a discrete circuit.

Figure 7:
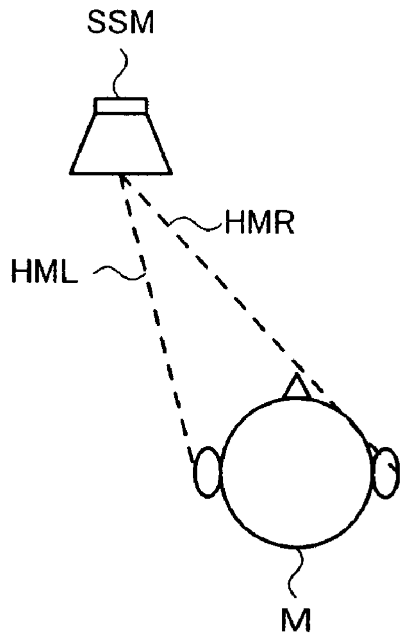
FIG. 7 is a plan view for explaining the present invention.

As shown in FIG. 7, when a sound source SSM is disposed in front of a listener M, assuming that HML is the transfer function from the sound source SSM to the left ear of the listener M and HMR is the transfer function from the sound source SSM to the right ear of the listener M, it is necessary to cause the digital processing circuit 5 to accomplish the transfer functions HML and HMR.

Figure 8:
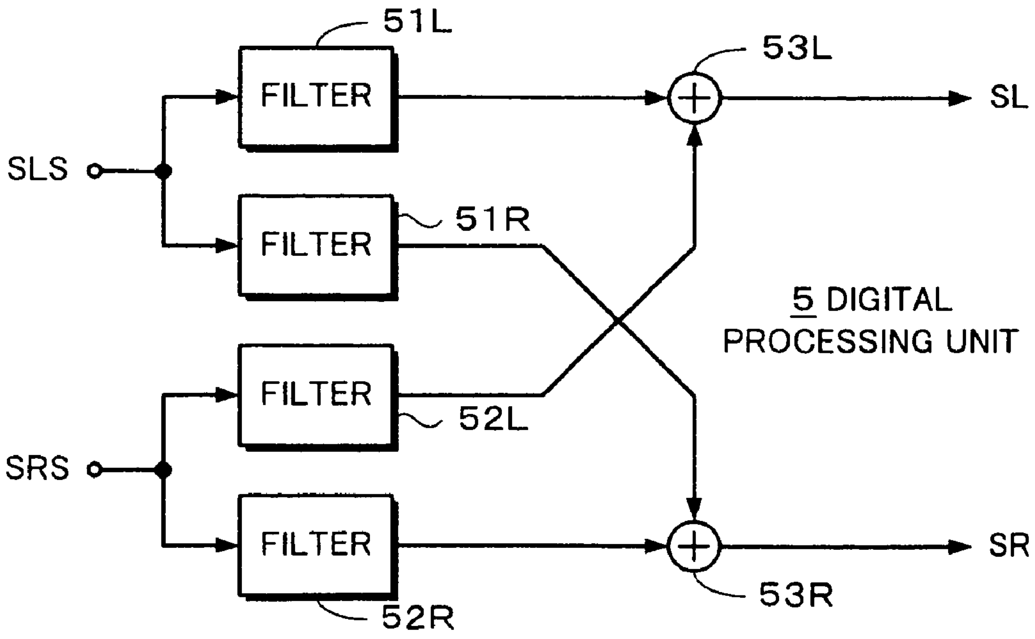
FIG. 8 is a schematic diagram showing the structure of a circuit according to the first embodiment of the present invention.

As shown in FIG. 8, the digital processing circuit 5 is composed of digital filters 51L, 52L, 51R, and 52R and adding circuits 55L and 55R. As with the digital filters 41L to 44R shown in FIG. 5, the digital filters 51L to 52R can be structured as shown in FIG. 6.

Audio signals SLS and SRS are supplied from the digital processing circuit 4 to the adding circuit 55L through the digital filters 51L and 52L. In addition, the audio signals SLS and SRS are supplied from the digital processing circuits 4 to the adding circuit 55R through the digital filters 51R and 52R. At this point, the transfer functions of the digital filters 51L to 52R are set to predetermined values. Impulse responses of which the transfer functions are converted on the time axis are superimposed to the audio signals SLS and SRS.

Thus, the adding circuit 55L outputs the audio signal SL. The adding circuit 55R outputs the audio signal SR. In other words, the adding circuits 55L and 55R output the audio signals SL and SR that allow a sound field of which the audio signals SLS and SRS are reproduced with speakers to be accomplished with the headsets 5.

In such a manner, the digital processing circuit 4 converts the audio signals SLF to SRB of four channels to the audio signals SLS and SRS that allow a sound field of four speakers to be accomplished with two speakers. The digital processing circuit 5 converts the signals SLS and SRS into the audio signals that allow a sound field of speakers to be accomplished with the headsets 8. Thus, when the audio signals SL and SR are supplied to the headsets 8, a sound field of four speakers is accomplished.

Thus, the above-described audio reproducing apparatus 10 can reproduce a sound field of four channels for speakers with the headsets 8. Generally, since the amount of the signal process of the digital processing circuit 4 that decreases the number of channels is smaller than the amount of the signal process of the digital processing circuit 5 that reproduces a sound field of speakers with headsets, the circuit scale of the above-described audio reproducing apparatus 10 can be reduced in comparison with the case that one digital processing circuit performs all processes. Thus, the cost of the audio reproducing apparatus 10 can be reduced.

In addition, the sound image SIFF of the audio signal SFF can be localized at any position in front of the listener M by the distributing circuit 3.

Figure 9:
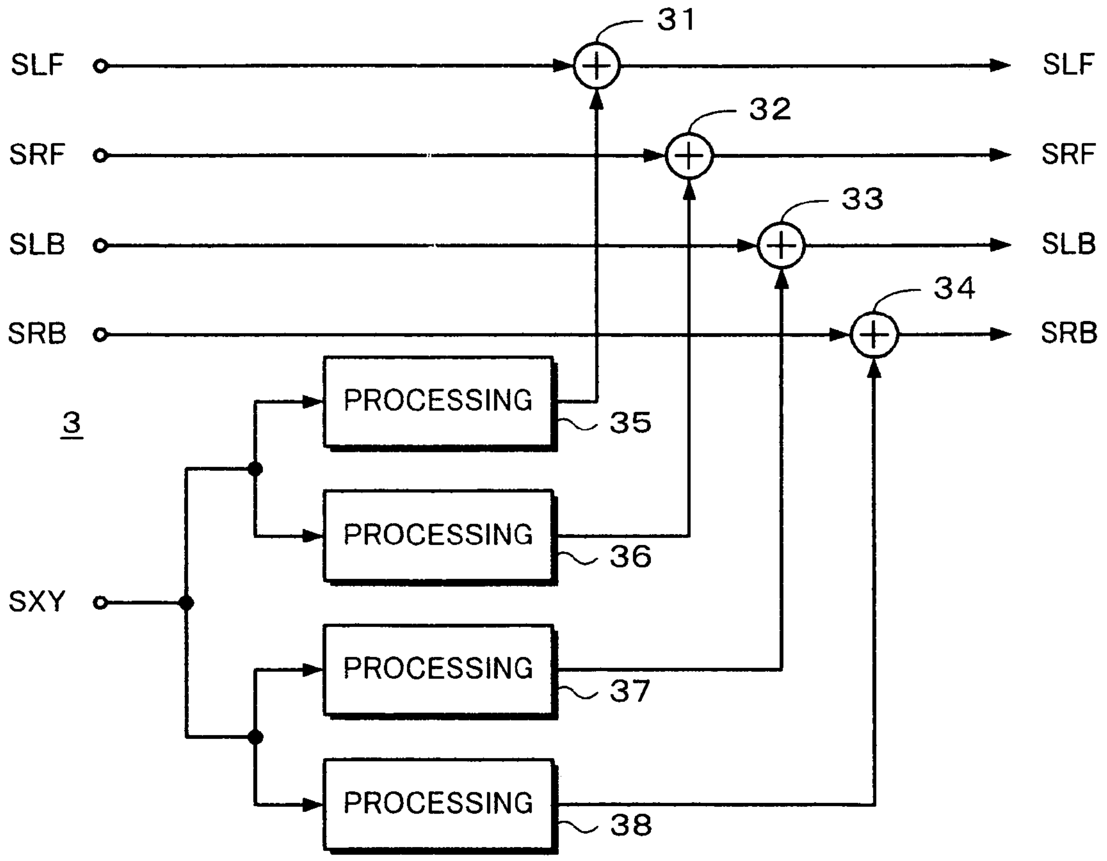
FIG. 9 is a schematic diagram showing the structure of a circuit according to the first embodiment of the present invention.

FIG. 9 shows the structure of the distributing circuit 3 that allows an audio image of the audio signal SFF as the fifth channel to be localized at any position of the sound field of the audio signals SLF to SRB.

In other words, digital audio signals SFF to SRB are supplied from A/D converter circuits 21 to 24 to the next staged digital processing circuit 4 through adding circuits 31 to 34, respectively. At this point, a digital audio signal SFF is supplied from an A/D converter circuit 25 to the adding circuits 31 to 34 through signal processing circuits 35 to 38, respectively. In this example, the signal processing circuits 35 to 38 are for example variable attenuator circuits. Thus, the signal SFF is distributed and mixed with the signals SLF to SRB with ratios determined by the variable attenuator circuits 35 to 38, respectively.

The structure of the digital processing circuit 4 and the downstream circuits thereof is the same as the structure of the audio reproducing apparatus 10 shown in FIG. 1. Thus, with the headsets 8, a sound field of which audio signals SLF to SRB of four channels are supplied to four speakers can be accomplished.

At this point, when the ratio of the signal SFF distributed to the signals SLF and SLB of left channels and the ratio of the signal SFF distributed to the signals SRF and SRB on right channels are complementarily varied by the distributing circuit 3, the sound image of the signal SFF is moved on the left and right in the sound field of the signals SLF to SRB. When the ratio of the signal SFF distributed to the signals SLF and SRF of front channels and the ratio of the signal SFF distributed to the signals SLB and SRB of back channels are complementarily varied, the sound image of the signal SFF is moved to the front and back in the sound field of the signals SLF to SRB.

Thus, the sound image of the signal SFF can be localized at any position of the sound field of the signals SLF to SRB.

When the signal processing circuits 31 to 34 are phase shifter circuits that cause the phases of the signals SFF and SFF distributed to the signals SRL and SRB to differ from each other, a sound image of the signal SFF can be moved and localized outside the virtual speakers corresponding to the phase difference. In addition, with the signal SFF and a signal that represents the localized position thereof, the signal processing circuits 31 to 34 can be controlled.

Figure 10:
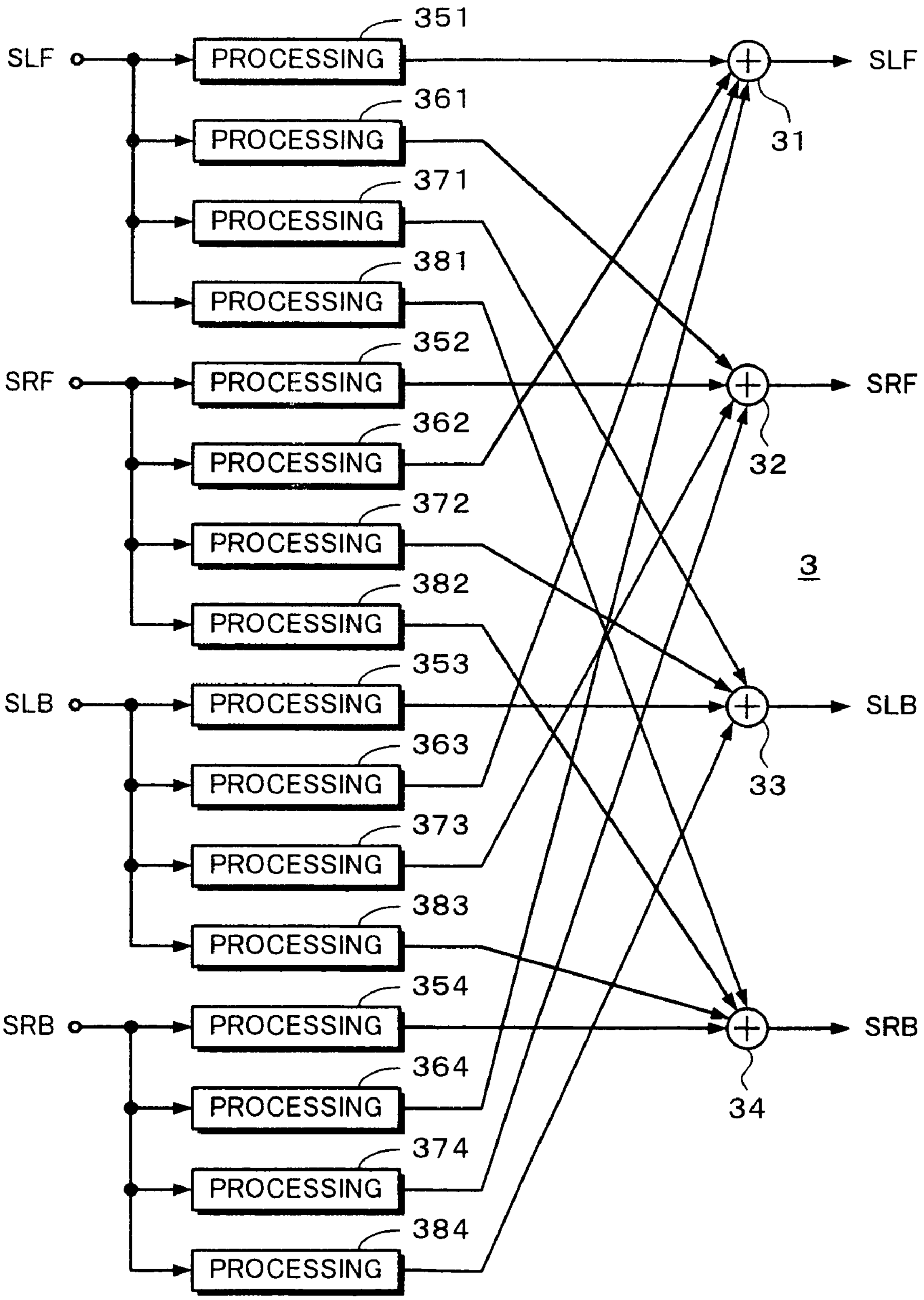
FIG. 10 is a schematic diagram showing the structure of a circuit according to the first embodiment of the present invention.

FIG. 10 shows the structure of the distributing circuit 3 that can localize sound images of the audio signals SLF to SRB to any positions of the sound field.

In other words, digital audio signals SLF to SRB are supplied from A/D converter circuits 21 to 24 to the next staged digital processing circuit 4 through signal processing circuits 351 to 354 and adding circuits 31 to 34, respectively. In addition, the signal SLF is supplied to the adding circuits 32 to 34 through the signal processing circuits 361 to 381. The signal SRF is supplied to the adding circuits 31, 33, and 34 through the signal processing circuits 362 to 382. The signal SLB is supplied to the adding circuits 31, 32, and 34 through the signal processing circuits 363 to 383. The signal SRB is supplied to the adding circuits 31 to 33 through the signal processing circuits 364 to 384. In such a manner, signals of other channels are distributed and mixed with the signals SLF to SRB.

The structure of the digital processing circuit 4 and the downstream circuits thereof is the same as the structure of the audio reproducing apparatus 10 shown in FIG. 1. Thus, with the headsets 8, a sound field of which audio signals SLF to SRB of four channels are supplied to four speakers can be accomplished.

At this point, since the signals SLF to SRB that are output from the distributing circuit 3 are mixed with signals of other channels in predetermined ratios, by varying the ratios, the localized positions of the audio images of the signals SLF to SRB or the sound field thereof can be varied corresponding to the ratios. When the signal processing circuits 351 to 384 are phase shifter circuits that cause the phases of signals distributed to the signals SLF and SRF to differ from each other, the localized positions of the sound images and the sound field can be extended.

Figure 11:
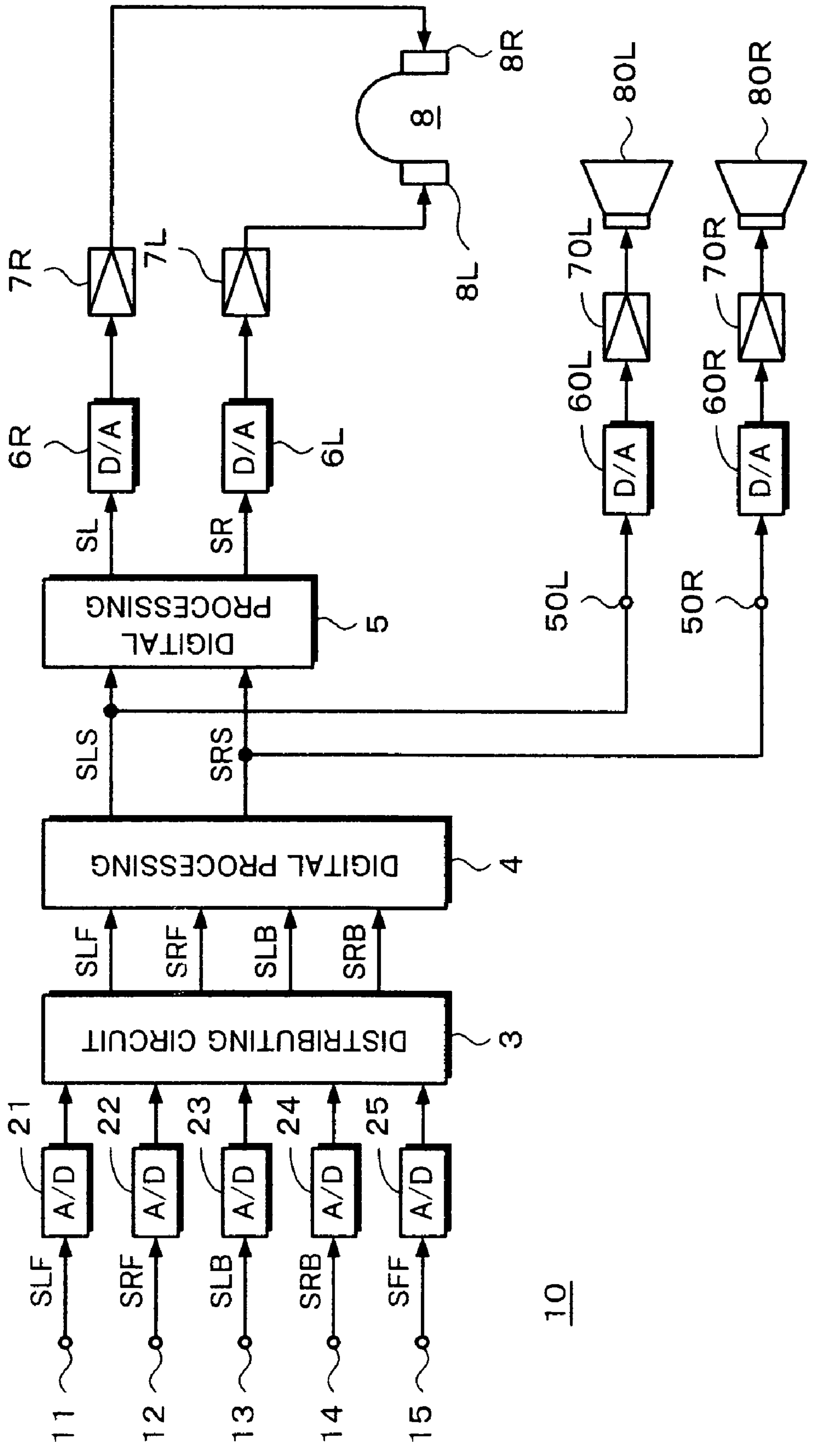
FIG. 11 is a block diagram showing the structure of a second embodiment of the present invention.

FIG. 11 shows a structure of which speakers can be used along with headsets 8. In other words, the structure of audio signal lines from input terminals 11 to 15 to headsets 8 is the same as the audio reproducing apparatus 10 shown in FIG. 1. In addition, audio signals SLS and SRS are supplied from a digital processing circuit 4 to D/A converter circuits 60L and 60R through terminals 50L and 50R, respectively. The D/A converter circuits 60L and 60R convert the audio signals SLS and SRS into analog audio signals SLS and SRS, respectively. The analog audio signals SLS and SRS are supplied to speakers 80L and 80R through power amplifiers 70L and 70R, respectively. The speakers 80L and 80R are disposed at a left front position and a right front position of the listener.

Thus, with the headsets 8, a sound field of four speakers can be accomplished. In addition, with the two speakers 80L and 80R, a sound field of four speakers can be accomplished.

Moreover, in such a case, the circuits from the input terminals to the digital processing circuit 5 can be shared by the headsets 8 and the speakers 80L and 80R. It is not necessary to change the characteristics of the signal processing circuit 3 and the digital processing circuit 4 when the headsets 8 or the speakers 80L and 80R are used. When the digital processing circuit 4 is composed of a DSP, it is not necessary to change the processes and parameters thereof.

Figure 12:
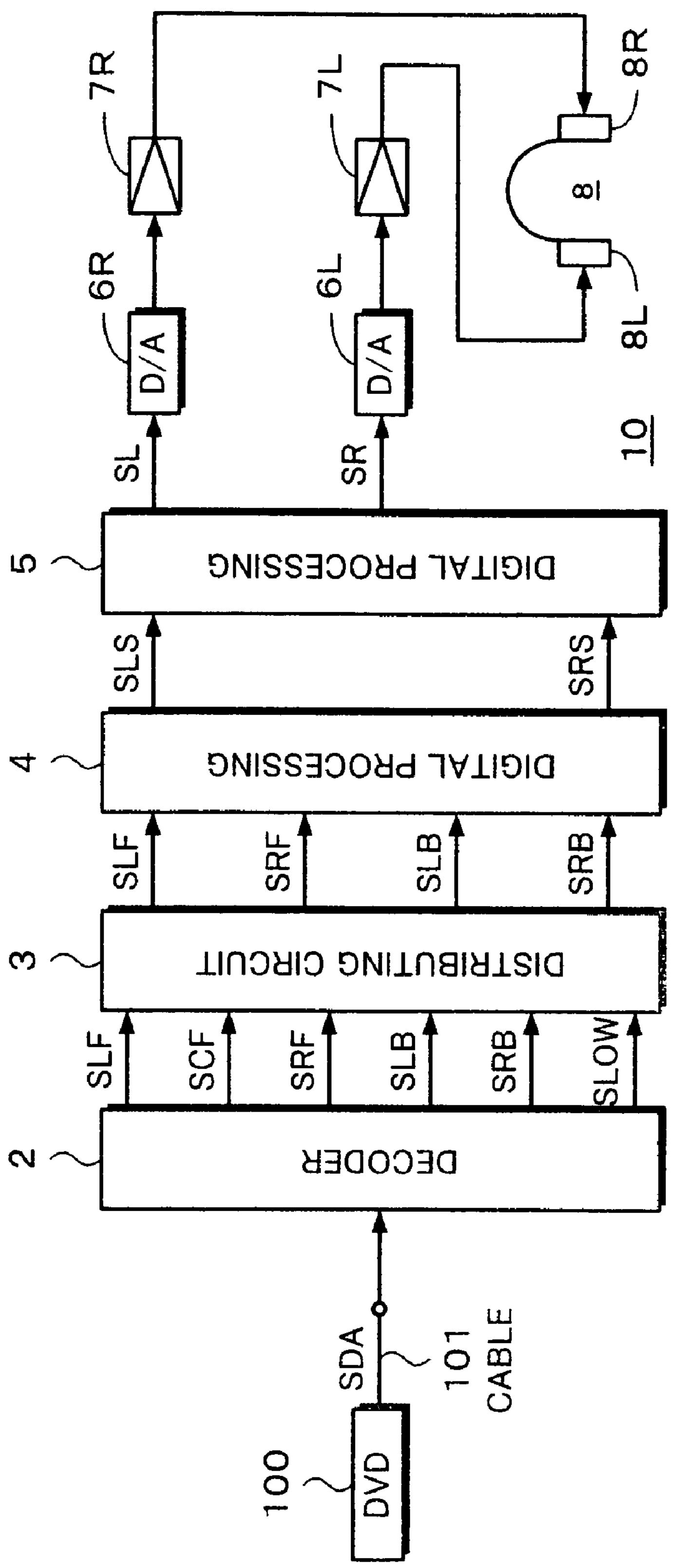
FIG. 12 is a block diagram showing the structure of a circuit according to a third embodiment of the present invention.

FIG. 12 shows the structure of which the audio reproducing apparatus 10 is connected to a signal source of digital audio signals of multiple channels. In FIG. 12, reference numeral 100 is a signal source of digital audio signals. In this example, the signal source 100 is a DVD player. The DVD player 100 outputs for example a digital audio signal SDA of 5.1 channels according to the Dolby digital system (AC-3).

The digital audio signal SDA is a signal of which digital audio signals SLF, SCF, SRF, SLB, SRB, and SLOW have been encoded into serial data of one channel (as a bit stream). The digital audio signals SLF, SCF, SRF, SLB, and SRB are signals reproduced with speakers disposed at a left front position, a center front position, a right front position, a left back position, and a right back position of the listener. The signal SLOW is a low band signal of 120 Hz or less. Generally, the signal SDA is supplied to a dedicated adaptor. The adaptor decodes and converts the digital signal SDA to the original analog audio signals SLF to SLOW of six channels. The decoded analog audio signals SLF to SLOW are supplied to respective speakers. The speakers generate a sound field of these analog audio signals.

The signal SDA is supplied from the player 100 to a decoder circuit 2 of an audio reproducing apparatus 10 through a coaxial cable 101. The decoder circuit 2 decodes or separates the signal SDA into the audio signals SLF to SLW. The audio signals SLF to SLOW are supplied to a distributing circuit 3.

Figure 13:
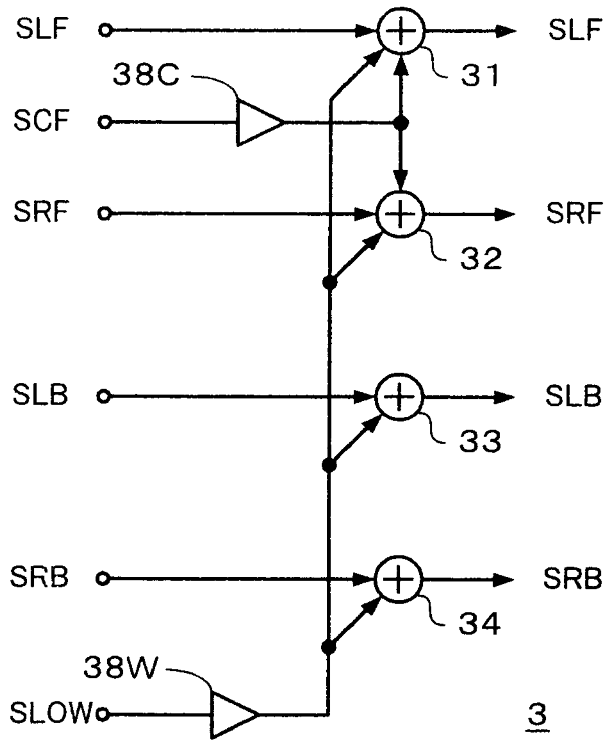
FIG. 13 is a schematic diagram showing the structure of a circuit according to the third embodiment of the present invention.

The distributing circuit 3 is structured as shown in FIG. 13. In other words, a sound image of which the audio signal SCF of center front channel is supplied to a speaker disposed at a center front position of the listener can be reproduced with speakers disposed at a left front position and a right front position of the listener. The audio signal SLOW of low band channel is a signal at a low frequency. Thus, a sound image of the signal SLOW does not have a directivity.

In the distributing circuit 3 shown in FIG. 13, the digital audio signals SLF and SRF that are output from the decoder circuit 2 are supplied to the next staged digital processing circuit 4 through adding circuits 31 and 32. The digital audio signal SCF is supplied from the decoder circuit 2 to the adding circuits 31 and 32 through an attenuating circuit 38C. The audio signal SCF is separated into the audio signals SLF and SRF.

The digital audio signals SLB and SRB that are output from the decoder circuit 2 are supplied to the next staged digital processing circuit 4 through adding circuits 33 and 34, respectively. The digital audio signal SLOW that is output from the decoder circuit 2 is supplied to adding circuits 31 to 34 through an attenuating circuit 38W. The audio signal SLOW is distributed to the audio signals SLF to SRB. In such a manner, the signals SLF to SLOW are converted into the audio signals SLF to SRB of four channels.

As shown in FIG. 12, the audio signals SLF to SRB are supplied to the digital processing circuit 4. The digital processing circuit 4 converts the audio signals SLF to SRB into signals SLS and SRS. The signals SLS and SRS are supplied to a digital processing circuit 5. The digital processing circuit 5 converts the signals SLS and SRS into audio signals SL and SR for headsets. Thereafter, the audio signals SL and SR are supplied to the headsets 8 through D/A converter circuits 6L and 6R and amplifiers 7L and 7R, respectively.

Thus, with the audio reproducing apparatus 10, a sound field of which audio signals SLF to SLOW of six channels are supplied to six speakers can be accomplished with the headsets 8.

In this case, the DVD player 1 and the audio reproducing apparatus 10 can be easily connected with only one cable 101. In addition, since the digital audio signal SDA reproduced by the DVD player 100 is directly supplied to the audio reproducing apparatus 10, not converted into an analog audio signal, the sound quality can be prevented from deteriorating.

In the audio reproducing apparatus 10, as with the audio reproducing apparatus shown in FIG. 11, when the audio signals SLS and SRS that are output from the digital processing circuit 4 are supplied to speakers disposed at a left front position and a right front position of the listener through D/A converters and power amplifiers, a sound field of six speakers can be accomplished with the two speakers.

Figure 14:
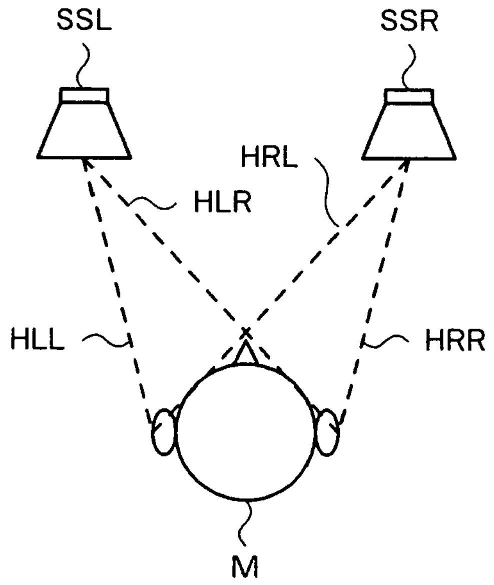
FIG. 14 is a plan view for explaining the present invention.

In the case that a sound image is localized at any position outside the head of a listener M with sound sources SSL and SSR disposed at a left front position and a right front position of the listener M as shown in FIG. 14, when the listener M turns his or her head, transfer functions HLL, HLR, HRL, and HRR are varied. The variations of the transfer functions HLL to HRR are factors with which the listener M recognizes the position of a sound image. It is known that when the variations of the transfer functions are reproduced, the sound image can be accurately localized.

However, in the above-described audio reproducing apparatus 10, the transfer functions are fixed regardless of the orientation of the head of the listener M. Thus, when audio signals for headsets are reproduced with the audio reproducing apparatus 10, the sound images thereof are localized at fixed positions regardless of the orientation of the head of the listener M.

Thus, when the listener who is listening to a music of an orchestra turns his or her head, he or she feels as if the orchestra follows the orientation of his or her head. In the case of the audio reproducing apparatus 10 shown in FIG. 12, a picture reproduced by the DVD player 100 is displayed at a so-called absolute position by a display unit regardless of the orientation of the listener M. In contrast, when the listener turns his or her head, the sound image follows his or her head. Thus, the position of the picture deviates from the position of the sound image.

Figure 15:
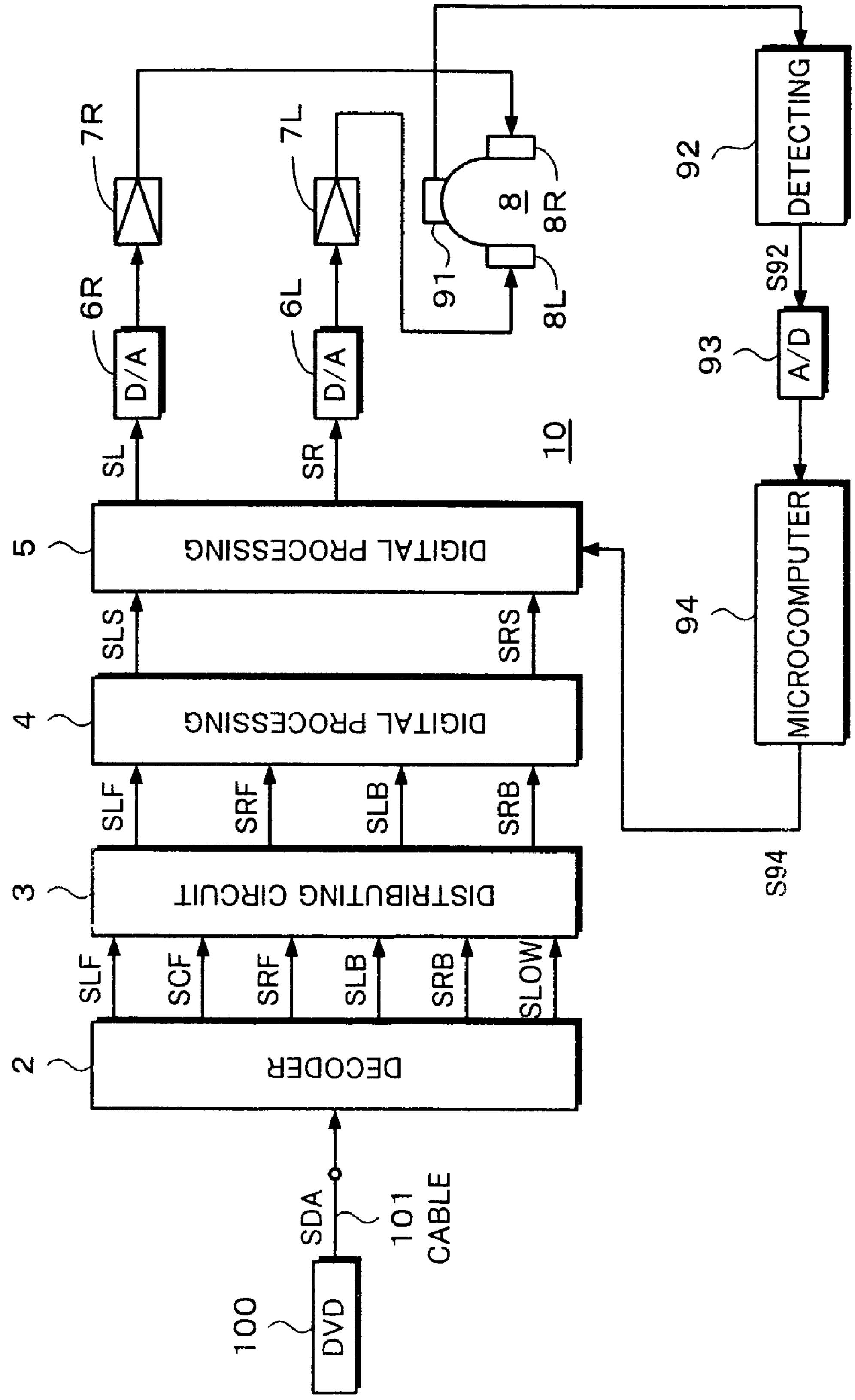
FIG. 15 is a block diagram showing the structure of a fourth embodiment of the present invention.

FIG. 15 shows the structure of which a sound image is localized at a predetermined position regardless of the orientation of the head of a listener.

In FIG. 15, audio signal lines from a DVD player 100 to headsets 8 are the same as those shown in FIG. 12. A rotating angular velocity sensor 91 such as a voltage vibration gyro or a geomagnetism azimuth sensor is disposed in the headsets 8. An output signal of the rotating angular velocity sensor 91 is supplied to a detecting circuit 92. The detecting circuit 92 detects an angular velocity corresponding to the orientation of the head of the listener. The detected angular velocity is supplied as a detection signal S92 to an A/D converter circuit 93. The A/D converter circuit 93 converts the detection signal S92 as an analog signal into a digital signal. The digital detection signal S92 is supplied to a microcomputer 94.

The microcomputer 94 samples the detection signal S92 at predetermined intervals and integrates the samples of the detection signal S92 so as to convert the detection signal S92 into angular data that represents the orientation of the head of the listener. In addition, the microcomputer 94 generates a control signal S94 for localizing a sound image with the angular data and supplies the control signal S94 to a digital processing circuit 5. The digital processing circuit 5 controls the transfer functions of the digital filters 51L to 52R.

In the case that a sound source is disposed in front of the listener M, when the listener turns to the right, since the left ear of the listener approaches the sound source, the delay of the sound wave that enters the left ear becomes small and the level of the sound wave rises. In contrast, the delay of the sound wave that enters the right ear becomes large and the level of the sound wave lowers. Thus, the coefficients of the digital filters 51L to 52R are controlled corresponding to the signal S94 so that such variations of the transfer functions are accomplished.

Thus, when the listener M turns his or her head, the transfer functions of the digital processing circuit 5 vary corresponding to the orientation of the head. Sound images generated by acoustic units 8L and 8R are localized at fixed positions outside of the head regardless of the orientation thereof. Thus, when the listener M who is listening to a music of an orchestra turns his or her head, he or she hears the music as if he or she turns his or her head in front of the orchestra (the orchestra is not moved). Alternatively, while the DVD player 100 is reproducing a sound and a picture, even if the listener turns his or her head, the localized position of the sound matches the position of the picture.

The digital processing circuit 45 of the audio reproducing apparatus 10 shown in FIG. 15 can be structured as follows.

In FIG. 14, when the listener M turns his or her head to the right, the left ear of the listener M approaches the sound source SL. In contrast, the right ear of the listener M goes apart from the sound source SL. Thus, the sound wave of the sound source SL reaches the left ear more earlier than the right ear. In addition, the level of the sound wave that reaches the left ear is higher than the level of the sound wave that reaches the right ear. Thus, when variations against the reference orientation (namely, the variation of the arrival time of the sound wave and the variation of the level), the transfer functions can be dynamically simulated.

Figure 16:
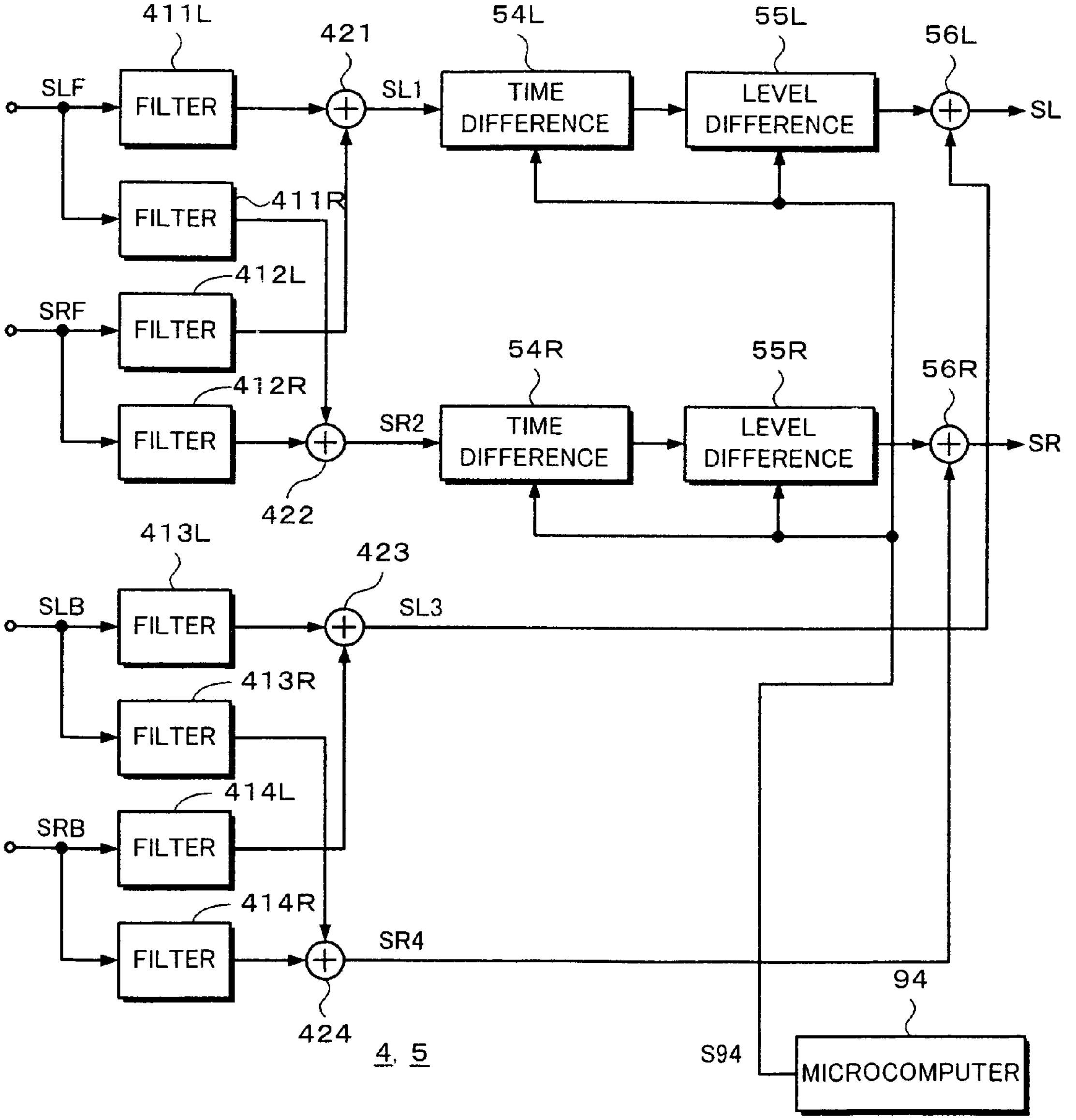
FIG. 16 is a schematic diagram showing the structure of a circuit according to the fourth embodiment of the present invention.

In circuits 4 and 5 shown in FIG. 16, audio signals SLF and SRF are supplied from the distributing circuit 3 to adding circuits 421 and 422 through digital filters 411L and 412R. In addition, the audio signals SLF and SRF are supplied to the adding circuits 422 and 421 through digital filters 411R and 412L. At this point, the transfer functions of the digital filters 411L to 412R are set to predetermined values in the above-described manner. Impulse responses of which the transfer function portions of formulas (1) and (2) are converted on the time axis are superimposed to the audio signals SLF and SRF. The resultant signals are extracted as audio signals SL1 and SR2 of left front channel and right front channel from the adding circuits 421 and 422, respectively.

The audio signals SL1 and SR2 are supplied to adding circuits 56L and 56R through time difference adding circuits 54L and 54R and level difference adding circuits 55L and 55R, respectively.

Audio signals SLB and SRB are supplied from the distributing circuit 3 to adding circuits 423 and 424 through digital filters 413L and 414R. In addition, the audio signals SLB and SRB are supplied to the adding circuits 424 and 423 through digital filters 413R and 414L. At this point, the transfer functions of the digital filters 413L to 414R are set to predetermined values in the above-described manner. Impulse responses of which the transfer function portions of formulas (1) and (2) have been converted on the time axis are superimposed to the audio signals SLB and SRB. The resultant signals are extracted as audio signals SL3 and SR4 of left back channel and right back channel from the adding circuits 423 and 424, respectively. The audio signals SL3 and SR4 are supplied to adding circuits 56L and 56R, respectively.

The adding circuit 56L adds the signal SL1 of left front channel and the signal SL3 of left back channel and outputs the resultant signal as a signal SL of left channel. The adding circuit 56R adds the signal SR2 of right front channel and the signal SR4 of right back channel and outputs the resultant signal as a signal SR4 of right back channel. These signals SL and SR are supplied to the acoustic units 8L and 8R through the D/A converters 6L and 6R and the amplifiers 7L and 7R, respectively.

Thus, when the audio signals SL and SR are supplied to the headsets 8, sound images of which audio signals SLF to SRB are supplied to four speakers can be equivalently accomplished. Thus, a sound filed of four speakers can be equivalently accomplished.

However, in this case, since the coefficients of the digital filters 411L to 414R are fixed, the localized positions of the sound images reproduced with the headsets 8 are fixed against the listener M. Thus, as was described above, when the listener M turns his or her head, the sound images are also moved corresponding to the orientation of the head of the listener M.

To prevent such a problem, with a signal S94 that is output from a microcomputer 94, the time differences and level differences added to adding circuits 54L to 55R are controlled. In other words, the adding circuits 54L and 54R are composed of for example variable delaying circuits. The adding circuits 55L and 55R are composed of for example variable gain circuits.

In the case that a sound source is disposed in front of the listener M, when the listener M turns his or her head to the right, the time delay of the sound wave that enters the left ear of the listener M becomes small and the level thereof rises. Thus, the characteristic of the adding circuit 54L is controlled as denoted by a polygonal line B of FIG. 17. The characteristic of the adding circuit 55L is controlled as denoted by a curve C of FIG. 18. Due to the relation of the left ear and right ear of the listener M, the characteristic of the adding circuit 54R is controlled as denoted by a polygonal line A of FIG. 17. The characteristic of the adding circuit 55R is controlled as denoted by a curve D of FIG. 18. The coefficients of the digital filters 411L to 414R are fixed to values of which the listener M faces the front.

Figure 17:
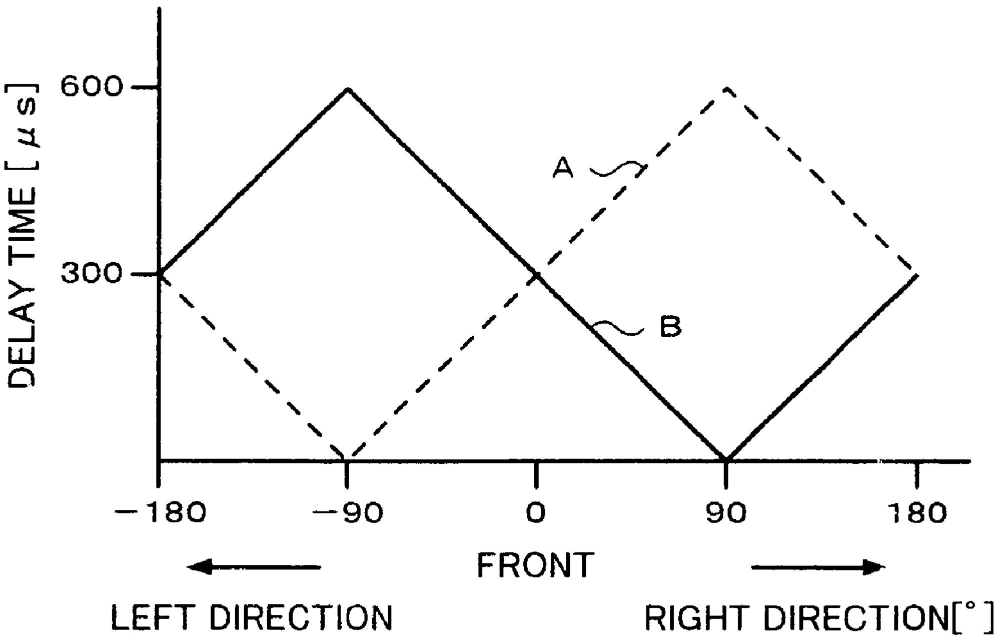
FIG. 17 is a graph for explaining characteristics of the present invention.
Figure 18:
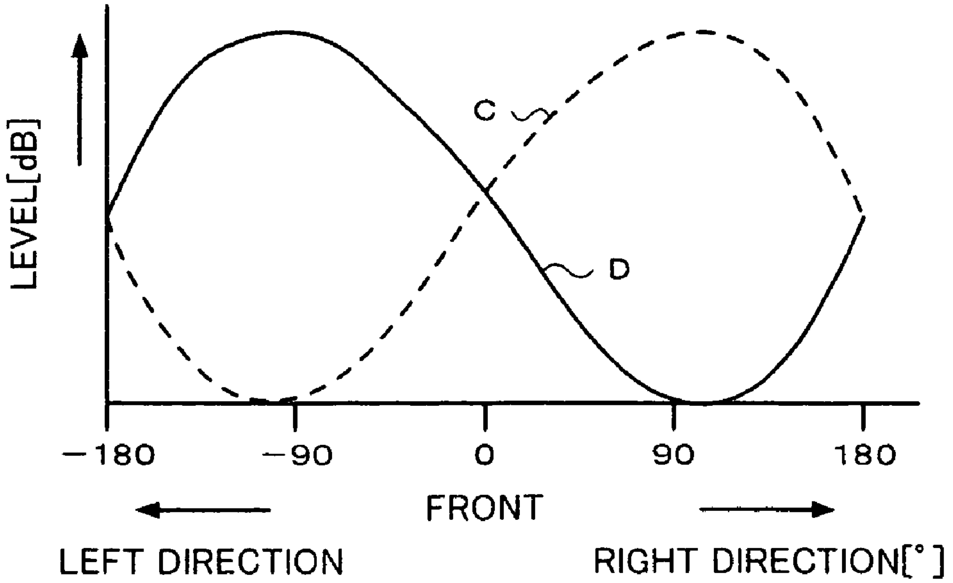
FIG. 18 is a graph for explaining characteristics of the present invention.

Thus, when the listener turns his or her head, the time difference and level difference between the signals SL1 and SR2 of front channels vary as shown in FIGS. 17 and 18, respectively. Thus, a sound image in front of the listener M is localized at a fixed position outside the head thereof regardless of the orientation thereof.

Although the time difference and level difference between the signals SL3 and SR4 of back channels are not processed, it is easier to localize a sound image behind the listener M than in front of the listener M. With the digital filters 413L to 414R of which impulse responses are superimposed to signals SL3 and SR4, sound images can be localized behind the head of the listener M. Experimental results show that when the time difference and level difference are processed for the signals SL3 and SR4 of back channels, sound images are inadequately localized behind the head of the listener M.

Thus, the processes for adding the time difference and level difference for the signals SL3 and SR4 of back channels can be omitted. Consequently, a sound image can be localized behind the head of the listener M without deterioration of sense of presence.

In the headsets, the variations of the coefficients of the digital filters 411L to 412R are substituted or simulated with the time difference and level difference between the audio signals SL1 and SR2. Thus, the circuit scale of the apparatus can be remarkably reduced. In addition, the cost of the apparatus can be prevented from rising.

Figure 19:
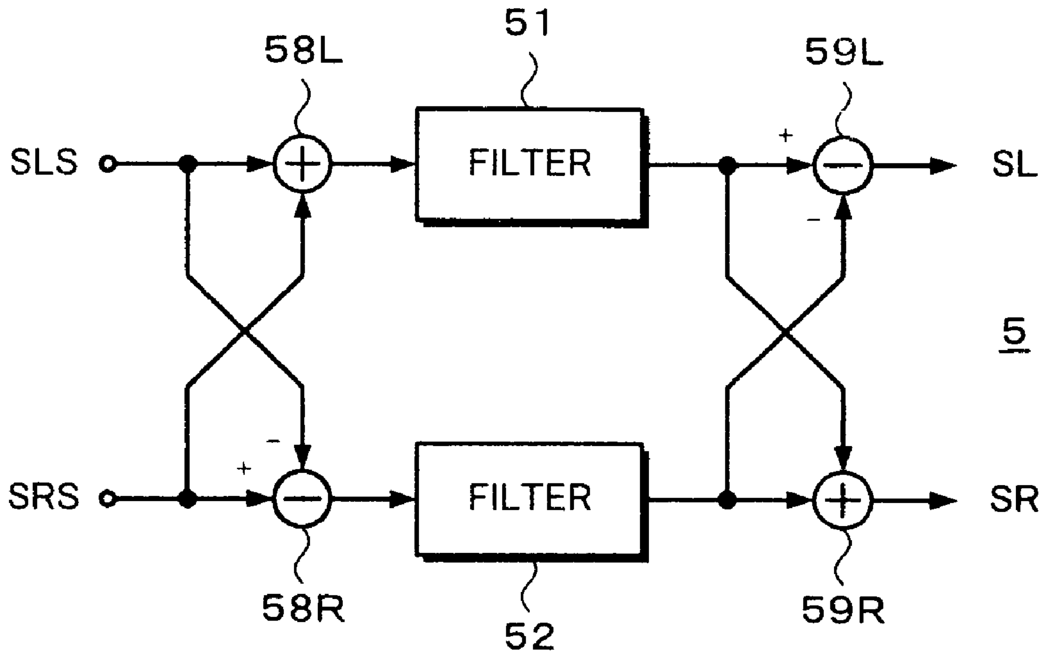
FIG. 19 is a schematic diagram showing the structure of a circuit according to the fourth embodiment of the present invention.

The digital processing circuit 5 may be structured as shown in FIG. 19. In other words, audio signals SLS and SRS that are output from a digital processing circuit 4 are added with a predetermined ratio by an adding circuit 58L. The resultant signal is supplied to a digital filter 51. In addition, audio signals SLS and SRS are subtracted with a predetermined ratio by a subtracting circuit 58R. The resultant signal is supplied to a digital filter 52.

Output signals of the digital filters 51 and 52 are subtracted with a predetermined ratio by a subtracting circuit 59. The subtracting circuit 59 outputs a digital audio signal SL. Output signals of the filters 51 and 52 are added with a predetermined ratio by an adding circuit 59R. The adding circuit 59R outputs a digital audio signal SR.

Thus, the amount of data processed by the digital processing circuit 5 can be reduced. Consequently, the digital processing circuit 5 can be effectively composed of a DSP.

In addition, audio signals can be wirelessly supplied to the headsets 8.

INDUSTRIAL UTILIZATION

A sound field of which audio signals of multiple channels are supplied to relevant speakers can be equivalently accomplished by headsets. The circuit scale of the apparatus can be reduced in comparison with the structure of which all processes are separately performed. In addition, the cost of the apparatus can be reduced. Moreover, the localized positions of sound images can be changed.

An audio reproducing apparatus can be easily connected to a signal source of a digital audio signal such as a DVD player with only one cable. In addition, the digital audio signal of the signal source can be directly supplied to the audio reproducing apparatus. Thus, the sound quality of the digital audio signal can be suppressed from deteriorating. In addition, even if the listener turns his or her head, the localized position of a sound image generated by the headsets can be matched with the position of a picture.

The invention claimed is:

1. An audio reproducing apparatus, comprising:

A distributing unit for receiving input audio signals of N channels (where N≧5, N is an integer) including at least a first channel signal, a second channel signal, a third channel signal, a fourth channel signal, a fifth channel signal including only low frequency content and an additional channel signal being the center channel;

said distributing unit respectively combines said additional channel signal with said first channel signal and said second channel signal, and said distributing unit processes said fifth channel signal to produce combined signals of N−1 channels by respectively adding said fifth channel signal to at least said first channel signal, said second channel signal, said third channel signal and said fourth channel signal, wherein said combined signals represent the positions of sound images;

a first signal processing unit for processing the combined signals of N−1 channels so as to produce first processed signals having an equivalent sound field of M (where M<N−1, M is an integer) speakers; and a second signal processing unit for equivalently processing the first processed signals corresponding to transfer functions from the M speakers to both ears of the listener and producing output audio signals, wherein the output audio signals of the second signal processing unit are reproduced with the M speakers.

2. An audio reproducing apparatus, comprising:

a distributing unit receiving input audio signals of N channels (where N≧5, N is an integer) including at least a first channel signal, a second channel signal, a third channel signal, a fourth channel signal, a fifth channel signal including only low frequency content and an additional channel signal being the center channel;

the distributing unit respectively combining said additional channel signal with said first channel signal and said second channel signal, and the distributing unit including a variable attenuating unit for receiving the fifth channel signal, whereby a varying amount of the fifth channel signal is added to at least said first channel signal, said second channel signal, said third channel signal and said fourth channel signal to produce combined signals of N−1 channels, said combined signals represent the positions of sound images;

a first signal processing unit for processing the combined signals of N−1 channels so as to produce first processed signals having an equivalent sound field of M (where M<N−1, M is an integer) speakers; and a second signal processing unit for equivalently processing the first processed signals corresponding to transfer functions from the M speakers to both ears of the listener and producing output audio signals, wherein the output audio signals of the second signal processing unit are reproduced with the M speakers.

3. The audio reproducing apparatus as set forth in claim 1 further comprising:

an output for supplying the first processed signals of the first signal processing unit to an outside of the apparatus;

a detecting unit for detecting a motion of the head of the listener; and a controller for controlling the second signal processing unit according to an output signal of the detecting unit;

wherein the output audio signals of the second signal processing unit are wirelessly supplied to the M speakers.

* * * * *